UNITED STATES PATENT OFFICE.

ASAHEL K. EATON, OF NEW YORK, N. Y.

IMPROVED CHROME COMPOUND.

Specification forming part of Letters Patent No. 38,297, dated April 28, 1863.

*To all whom it may concern:*

Be it known that I, A. K. EATON, of New York, in the county of New York and State of New York, have discovered and perfected an entirely new chemical compound, the "Chromite of Baryta," which can be used advantageously as a printing, painting, or tinting material; and I do hereby declare that the following is a full and exact description thereof, of its mode of manufacture, chemical composition, and properties.

The chromite of baryta is produced by the same general chemical reaction as were the chromites of zinc, iron, manganese, copper, &c., first discovered by me in 1857, and made public at that time. These are all produced by the reaction, at a high heat, of bichromate of potash upon the sulphates of the different bases with which it is proposed to combine chromous acid. These chromites of various and almost opposite tints possess in common the property of great insolubility.

The chromite of baryta is manufactured as follows: Nine and one-fourth ($9\frac{1}{4}$) parts of bichromate of potash finely pulverized are intimately mixed with seven and one-fourth ($7\frac{1}{4}$) parts of pure sulphate of baryta, introduced into a fire-clay crucible or other suitable receptacle, and exposed to a temperature gradually increasing until it reaches a white heat. A reaction takes place, resulting in a mutual decomposition of the substances mixed. The sulphuric acid of the sulphate of baryta combines with the potash of the bichromate, forming sulphate of potash. The chromic acid released by this reaction, losing a portion of its oxygen, is immediately reduced to chromous acid, which combines with the baryta, forming chromite of that base.

The complete reaction may be expressed thus:

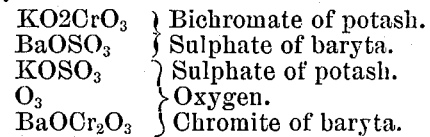

After the resulting compound is removed from the crucible it is thoroughly washed to remove the sulphate of potash and dried, and when the strongest color is required it is again ignited. Upon cooling it is ready for use. It is a fine green powder, very difficult of decomposition, and hence of great value as a color.

By the process above given the chromite is produced in the form of an amorphous powder. By throwing the mixture described into a crucible already heated to a white heat the chromite assumes the character of a beautiful crystalline powder; but for practical purposes this latter form is not generally desirable.

The chromite of baryta may be produced by other processes. Therefore I do not confine myself to the process above described.

Having thus fully described my invention, what I claim, and desire to secure by Letters Patent of the United States, is—

The chromite of baryta as a new article of manufacture.

A. K. EATON.

Witnesses:
G. BREED,
DANIEL BREED.